United States Patent
Yellapragada et al.

(10) Patent No.: US 10,558,856 B1
(45) Date of Patent: Feb. 11, 2020

(54) OPTICAL CHARACTER RECOGNITION (OCR) ACCURACY BY COMBINING RESULTS ACROSS VIDEO FRAMES

(71) Applicant: INTUIT INC., Mountain View, CA (US)

(72) Inventors: Vijay S. Yellapragada, Mountain View, CA (US); Peijun Chiang, Mountain View, CA (US); Sreeneel K. Maddika, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/121,376

(22) Filed: Sep. 4, 2018

Related U.S. Application Data

(62) Division of application No. 15/218,907, filed on Jul. 25, 2016, now Pat. No. 10,210,384.

(51) Int. Cl.
| | |
|---|---|
| G06K 9/00 | (2006.01) |
| G06T 7/11 | (2017.01) |
| G06F 17/27 | (2006.01) |
| G06Q 40/00 | (2012.01) |

(52) U.S. Cl.
CPC ..... *G06K 9/00442* (2013.01); *G06F 17/2765* (2013.01); *G06K 9/00469* (2013.01); *G06Q 40/123* (2013.12); *G06T 7/11* (2017.01); *G06K 2209/01* (2013.01); *G06T 2207/10004* (2013.01); *G06T 2207/30176* (2013.01)

(58) Field of Classification Search
CPC ............ G06F 16/7844; G06K 2209/01; G06K 9/00469; G06K 9/00463; G06K 9/00442; G06K 9/325; G06T 2207/30176; G06T 7/11; G06T 7/73; G06T 9/00469
See application file for complete search history.

(56) References Cited

U.S. PATENT DOCUMENTS

| | | | |
|---|---|---|---|
| 8,553,968 B1 * | 10/2013 | Lee .......................... | G06K 9/03 382/141 |
| 9,292,739 B1 * | 3/2016 | Gray ....................... | G06K 9/033 |
| 9,305,227 B1 * | 4/2016 | Nambiar .................. | G06K 9/18 |
| 9,400,790 B2 * | 7/2016 | Yasrebi ................... | G06F 16/51 |

(Continued)

FOREIGN PATENT DOCUMENTS

| | | |
|---|---|---|
| WO | 2014092978 A1 | 6/2014 |
| WO | 2015160988 A1 | 10/2015 |

*Primary Examiner* — Jingge Wu
(74) *Attorney, Agent, or Firm* — Patterson + Sheridan, LLP

(57) ABSTRACT

The present disclosure relates to optical character recognition using captured video. According to one embodiment, using a first image in stream of images depicting a document, the device extracts text data in a portion of the document depicted in the first image and determines a first confidence level regarding an accuracy of the extracted text data. If the first confidence level satisfies a threshold value, the device saves the extracted text data as recognized content of the source document. Otherwise, the device extracts the text data from the portion of the document as depicted in one or more second images in the stream and determines a second confidence level for the text data extracted from each second image until identifying one of the second images where the second confidence level associated with the text data extracted from the identified second image satisfies the threshold value.

20 Claims, 10 Drawing Sheets

(56) References Cited

U.S. PATENT DOCUMENTS

| | | | |
|---|---|---|---|
| 2002/0012465 A1* | 1/2002 | Fujimoto | G06K 9/00463 382/199 |
| 2005/0025362 A1* | 2/2005 | Blair | G06K 9/036 382/182 |
| 2006/0026003 A1* | 2/2006 | Carus | G10L 15/01 704/275 |
| 2006/0153452 A1 | 7/2006 | Kjeldsen et al. | |
| 2006/0262352 A1 | 11/2006 | Hull et al. | |
| 2010/0141758 A1 | 6/2010 | Kim et al. | |
| 2010/0246999 A1* | 9/2010 | Tillberg | G06K 9/00442 382/309 |
| 2011/0096983 A1* | 4/2011 | Jensen | G06K 9/033 382/161 |
| 2011/0123115 A1 | 5/2011 | Lee et al. | |
| 2012/0020532 A1 | 1/2012 | Snow et al. | |
| 2012/0029918 A1* | 2/2012 | Bachtiger | G06F 16/60 704/235 |
| 2013/0022271 A1* | 1/2013 | Sun | G06K 9/3208 382/182 |
| 2013/0022272 A1* | 1/2013 | Sun | G06K 9/3208 382/182 |
| 2013/0223721 A1* | 8/2013 | Nepomniachtchi | G06K 9/00536 382/138 |
| 2014/0212039 A1* | 7/2014 | Barkan | G06K 9/033 382/182 |
| 2014/0334731 A1 | 11/2014 | Tripathi et al. | |
| 2015/0009542 A1* | 1/2015 | Zhao | H04N 1/00331 358/462 |
| 2015/0120563 A1 | 4/2015 | Smith et al. | |
| 2015/0154193 A1* | 6/2015 | Dave | G06F 16/334 707/748 |
| 2016/0004773 A1* | 1/2016 | Jannink | G06F 16/61 707/741 |
| 2016/0371840 A1* | 12/2016 | Zhou | G06K 9/00664 |

* cited by examiner

| KEY DATA FIELD | VALUE |
|---|---|
| Box 1 (Wages, tips, other compensation) | 21008.07 |
| Social Security Number | ????? |
| Employer Identification Number | ????? |

FIGURE 7A

| KEY DATA FIELD | VALUE |
|---|---|
| Box 1 (Wages, tips, other compensation) | 21008.07 |
| Social Security Number | ????? |
| Employer Identification Number | 12-3456789 |

FIGURE 7B

| KEY DATA FIELD | VALUE |
|---|---|
| Box 1 (Wages, tips, other compensation) | 21008.07 |
| Social Security Number | 123-45-6789 |
| Employer Identification Number | 12-3456789 |

FIGURE 7C

OPTICAL CHARACTER RECOGNITION (OCR) ACCURACY BY COMBINING RESULTS ACROSS VIDEO FRAMES

CROSS-REFERENCE TO RELATED APPLICATIONS

This application is a divisional application of U.S. Ser. No. 15/218,907, filed Jul. 25, 2016, which is herein incorporated by reference.

BACKGROUND

Field

Embodiments presented herein generally relate to optical character recognition, and more specifically to performing optical character recognition on a document using video frames.

Description of the Related Art

Data processing is essential for a variety of business and personal transactions. For example, businesses use accounting and inventory data to generate and share reports related to various business metrics, such as sales, invoices, cash flow, or balance sheet information. In another example, individuals use income data from various sources (e.g., employers, passive investments, active investments, retirement plans) to determine tax liabilities (or entitlements to tax refunds) and prepare and file tax returns with the relevant tax authorities.

In many cases, individuals receive paper documents including the data needed to complete a business or personal transaction. For example, individuals may receive a variety of tax documents (e.g., W-2 forms with employment income for an individual, 1099-DIV forms reporting dividend income, 1099-INT forms reporting interest income, K-1 forms reporting partnership income, and so on) as paper documents to input into a computer to determine tax liabilities or eligibility for tax refunds and generate an individual tax return. Businesses may receive invoices from a variety of suppliers and generate invoices for goods or services rendered to customers. The received and generated invoices may be subsequently provided as input to a computer to generate, for example, a cash flow statement for a predetermined time period. In many cases, the documents used in these data processing operations may not have a consistent format. For example, while different W-2 forms generally include the same types of data (e.g., employer identification, taxable income, taxes withheld, and so on), locations of the data on a given form or document may vary across documents received from different sources.

To extract the data out of such documents, a computer may use an optical character recognition (OCR) system to convert an image of a document into machine-encoded text. The OCR system may extract text from the image, for example, on a field-by-field basis for a structured or semi-structured document or on an ad-hoc basis for an unstructured document. If the OCR system is unable to extract text from at least a portion of an image of the document (e.g., due to low image quality, such as low resolution or a blurry image), the OCR system can request that a user provide additional images to use in extracting text from a document.

SUMMARY

One embodiment of the present disclosure includes a method for evaluating text depicted in images of a source document. The method generally includes a device receives a stream of digital images depicting the source document. Using a first image in the stream, the device extracts text data in a portion of the document depicted in the first image and determines a first confidence level regarding an accuracy of the extracted text data. If the first confidence level satisfies a threshold value, the device saves the extracted text data as recognized content of the source document. Otherwise, the device extracts the text data from the portion of the document as depicted in one or more second images in the stream and determines a second confidence level for the text data extracted from each second image until identifying one of the second images such that the second confidence level associated with the text data extracted from the identified second image satisfies the threshold value.

Another embodiment provides a computer-readable storage medium having instructions, which, when executed on a processor, performs an operation for evaluating text depicted in images of a source document. The operation generally includes a device receives a stream of digital images depicting the source document. Using a first image in the stream, the device extracts text data in a portion of the document depicted in the first image and determines a first confidence level regarding an accuracy of the extracted text data. If the first confidence level satisfies a threshold value, the device saves the extracted text data as recognized content of the source document. Otherwise, the device extracts the text data from the portion of the document as depicted in one or more second images in the stream and determines a second confidence level for the text data extracted from each second image until identifying one of the second images such that the second confidence level associated with the text data extracted from the identified second image satisfies the threshold value.

Still another embodiment of the present invention includes a processor and a memory storing a program, which, when executed on the processor, performs an operation for evaluating text depicted in images of a source document. The operation generally includes a device receives a stream of digital images depicting the source document. Using a first image in the stream, the device extracts text data in a portion of the document depicted in the first image and determines a first confidence level regarding an accuracy of the extracted text data. If the first confidence level satisfies a threshold value, the device saves the extracted text data as recognized content of the source document. Otherwise, the device extracts the text data from the portion of the document as depicted in one or more second images in the stream and determines a second confidence level for the text data extracted from each second image until identifying one of the second images such that the second confidence level associated with the text data extracted from the identified second image satisfies the threshold value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 7A-7C illustrate an example of using successive video frames to perform optical character recognition of a semi-structured document, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
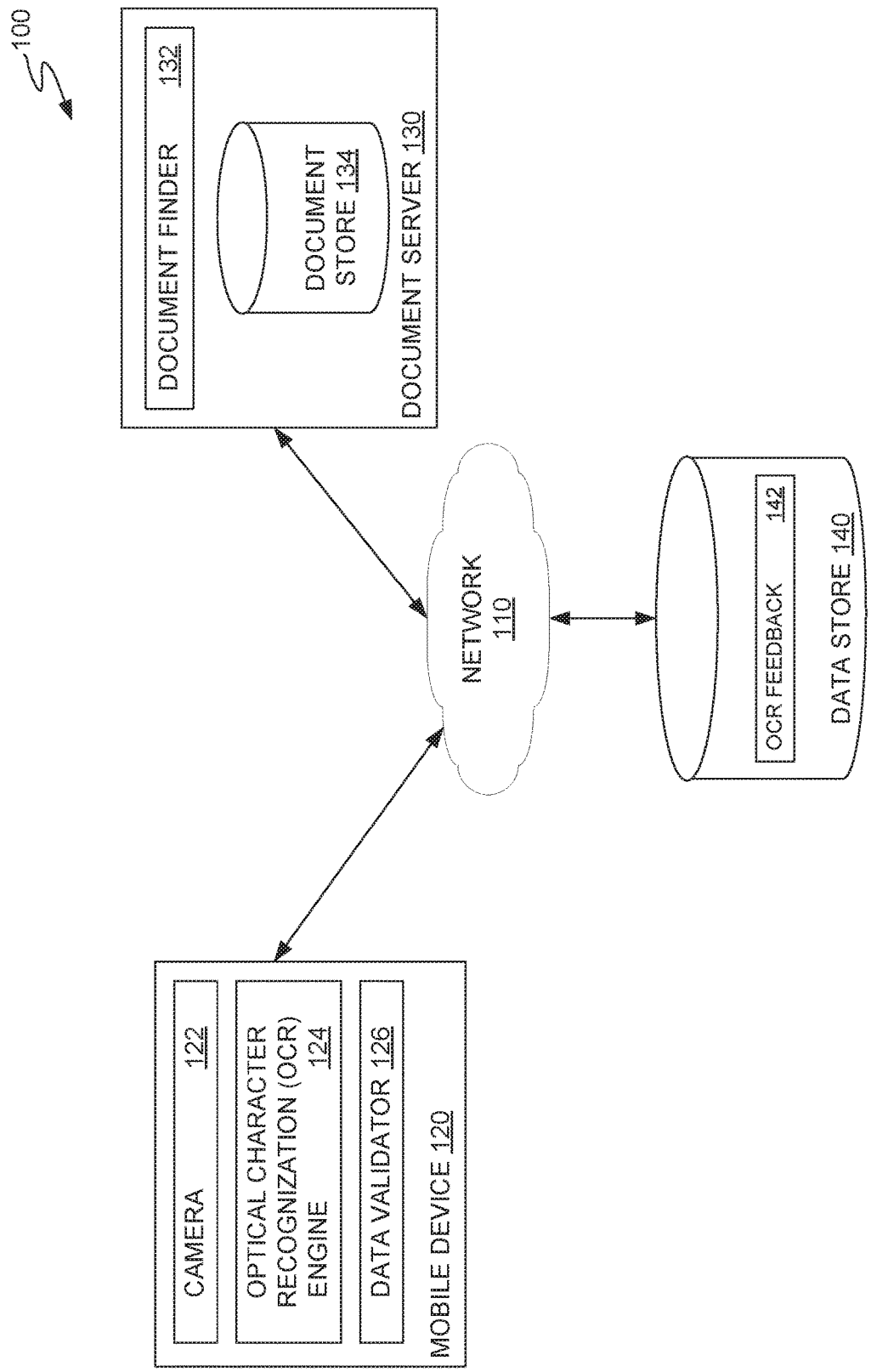
FIG. 1 illustrates an example computing environment, according to one embodiment.

Optical character recognition (OCR) systems are often used to import data from paper and/or electronic documents into data processing systems. OCR systems generally use an image obtained from a scanner, camera, or other image capture system as a source image, identify a document in the image, and attempt to identify textual content in the image. When an OCR system identifies textual content in a document, the OCR system can generate a text file with the identified content. The text file can subsequently be used as input to a data processing system. For example, in a tax preparation workflow, a text file with content from a W-2 may be provided as input to generate a tax return and determine tax liabilities or entitlement to refunds. In another example, a text file with content from a supplier invoice may be used as input into an accounting program to generate ledger entries and a cash flow statement for a set time period.

In some cases, an OCR system may inaccurately identify text in an image of a source document. For example, an OCR system may not be able to recognize text in a low-resolution source image of the source document. OCR systems may also not be able to recognize or accurately identify text in a blurry image of the source document. In such a case, an OCR system may request that a user provide a new image of the document or input information directly.

Devices used to generate images of source documents for OCR systems, such as mobile phones, tablet computers, or handheld computers, generally include cameras that can capture still pictures and video. Typically, these camera systems capture still pictures using a first, higher resolution and video using a second, lower resolution. For example, while a camera in a mobile device may be able to generate still images with a resolution of 8 megapixels, the camera may generate video at 30 frames per second with a resolution of 2 megapixels per frame.

Embodiments presented herein provide techniques for performing optical character recognition on source documents included in a video file or stream of images captured dynamically from a camera. Because video files generally include multiple frames, an OCR system can use successive frames in a video file to recognize text in a source image. If a frame includes a low-quality capture of a source document (e.g., low resolution, blurry, a partial document, and so on), an OCR system using video input need not request that a user provide a new image of the source document. The OCR system may extract some data (if any, depending on whether the video frame includes a portion of a document with sufficient quality to perform optical character recognition) from a first frame of a captured video file and use a subsequent frame in the video file to perform optical character recognition on at least the portions of the document that were unreadable in the first frame. The OCR system can perform optical character recognition on successive frames until the OCR system successfully extracts the text data from the source document.

FIG. 1 illustrates an example networked computing system for performing optical character recognition using video or a stream of images captured on a mobile device, according to one embodiment. As illustrated, computing system 100 includes a mobile device 120, document server 130, and data store 140, connected via network 110.

Mobile device 120 may be, for example, a smartphone, tablet computer, handheld personal computer. As illustrated, mobile device 120 generally includes a camera 122, optical character recognition (OCR) engine 124, and data validator 126.

Camera 122 is generally configured to capture still images and video (or a stream of still images) of a source document to be analyzed by OCR engine 124. Camera 122 may output video frames or a stream of images to a buffer in device memory while OCR engine 124 processes a frame and determines whether to request a new frame from camera 122 for processing. While camera 122 captures video frames or a stream of still images, camera 122 may adjust focus, lighting, contrast, exposure settings, and so on to attempt to obtain a clear image of a source document. While mobile device 120 performs character recognition operations on video frames or a stream of images captured by camera 122, applications on mobile device 120 can command camera 122 to continually adjust camera settings (e.g., focus, exposure, lighting, contrast, etc.) until mobile device 120 completes character recognition operations for the source document.

OCR engine 124 is generally configured to obtain a video frame or image in a stream of images from camera 122 and extract textual content from a document included in the video frame or image. To obtain an image for analysis, OCR engine 124 obtains a video frame or image from a stream of images from a buffer at camera 122. After obtaining the video frame or image, OCR engine 124 binarizes the image to generate a black-and-white version of the image (and of the document included in the image). In a binarized image, text and (in structured or semi-structured documents) field boxes may be rendered in black, while negative space may be rendered in white.

Using the binarized image, OCR engine 124 attempts to extract textual content from the document included in the binarized image. In some cases, when the document is a semi-structured document such as a tax form or invoice, OCR engine 124 may extract textual content on a field-by-field basis. For example, in a tax preparation workflow, OCR engine 124 can extract text from one or more fields in a W-2 form (e.g., taxable income, social security number, employer identification number, and so on) and associate an extracted value with a field identifier for further processing.

OCR engine 124 may generate a confidence level indicating a likelihood that the extracted text from the document is accurate. The confidence level may be generated, for example, on a per-character basis or on a per-field basis in a structured or semi-structured document. For confidence levels generated on a per-field basis, the confidence level may take into account, for example, an expected format of the data recognized in a field. For example, in OCR operations performed on a W-2 form, OCR engine 124 may decrease a confidence level for data recognized in a social security number field (in which alphabetical characters are not valid) if the OCR engine 124 returns a result with characters that are not numbers or a dash. In some cases, where OCR engine 124 is unable to recognize field content in a semi-structured or structured document (e.g., due to low resolution, blur, or other image artifacts that conceal the field content), OCR engine 124 may assign a null value to the content of the field and a confidence level associated with the field. The null value for both the content of the field and confidence level may indicate to data validator 126 that OCR engine 124 should perform character recognition on at least that field using another video frame or image from an image stream.

Data validator 126 obtains the extracted text and confidence level data from OCR engine 124 for post-processing and to determine whether to perform optical character recognition on a document using another video frame or image in a stream of images buffered at camera 122. To determine whether to perform optical character recognition on the document using another video frame or image from camera 122, data validator 126 can post-process the text provided by OCR engine 124, adjust confidence levels based on the adjustments performed in post-processing, and compare the adjusted confidence levels to a threshold value. If the adjusted confidence level for text extracted from a specific field is less than the threshold value, data validator 126 can identify the field for further analysis and determine that OCR engine 124 should perform character recognition on the field using another video frame or image from camera 122.

During post-processing, data validator 126 may apply one or more rules to validate or replace characters in the extracted text from OCR engine 124. For example, because OCR engine 124 may recognize the characters 'S' and '5' as the opposite character, a data validation rule for numerical data (e.g., a rule for processing data in a social security number or employer identification number field in a scanned W-2 form) may replace the character "S," if found in the text extracted from a numerical data field, with the character "5." In some cases, the data validation rule may further include a confidence level adjustment to increase a confidence level associated with the post-processed text if the post-processing results in the text conforming to an associated rule. In other cases, when a data validation rule does not include replacement characters but defines an acceptable or expected format for data, data validator can adjust the confidence level output from OCR engine 124 downwards to reflect that the text extracted from an image is likely to be incorrect.

After determining the confidence levels associated with the post-processed data, data validator 126 can update a running tally of recognized strings and the associated average confidence level using the post-processed data. In a case where a post-processed string matches an existing string recognized in previous scans of the same document (i.e., scans of the document obtained from the same video file or sequence of images), data validator 126 can increment a counter and update the average confidence level for that existing string. As data validator 126 examines and validates data from successive video frames or images, data validator 126 can identify a value for a field having, for example, the highest score based on a number of matches and confidence level associated with the value.

In some cases, when data validator 126 analyzes a structured or semi-structured document, data validator 126 can identify fields in the document that successive OCR operations on later video frames or images need not analyze. For example, in a tax preparation workflow, if OCR engine 124 extracts a valid social security number from a W-2 form with a confidence level satisfying a threshold value, data validator 126 can indicate to OCR engine 124 that successive OCR operations on another video frame can skip analyzing data in the social security number field. In another example, when data validator 126 determines that OCR engine 124 has recognized the same value in a data field over a threshold number of video frames, data validator 126 can indicate to OCR engine 124 that successive OCR operations on later video frames need not analyze data in the identified data field. When data validator 126 determines that OCR engine 124 has extracted text from each of the fields in a structured or semi-structured document with a confidence level for each of the fields satisfying a threshold value, data validator 126 can conclude OCR operations for the document. When data validator 126 completes OCR operations for the document, data validator 126 can flush an image buffer and provide recognized text to a workflow for additional processing (e.g., provide extracted W-2 data into a tax preparation workflow, extracted invoice data into a cash flow analysis workflow, and so on).

In some cases, mobile device 120 may have access to an authoritative document source for a structured or semi-structured document. To reduce an amount of time mobile device 120 uses in performing OCR operations on video or a stream of images including a source structured or semi-structured document, data validator 126 may examine data for a number of "key" data fields extracted from a video frame by OCR engine 124 and use the data for the "key" data fields to obtain an authoritative version of the document. For example, OCR engine 124 may be configured to extract data for the "key" data fields for a type of document (e.g., social security number, employer identification number, and total wage data in a W-2 form) but need not extract data from the other data fields in the document. The data in the designated "key" data fields of a structured or semi-structured document may uniquely identify a document to be imported into a workflow. Data validator 126 may use data from the "key" data fields to obtain a document from document server 130, which may reduce an amount of time mobile device 120 spends on performing OCR operations on a document and accelerate input into a data processing system. For example, in a tax preparation workflow where a user is scanning a W-2 form into the workflow, three fields may be identified as "key" data fields: the employer identification number, the employee social security number, and the employee's taxable income. In some cases, data validator 126 may determine whether to initiate OCR operations on another video frame or image from camera 122 based on whether OCR engine 124 has extracted the "key" data from a document with a confidence level above a defined threshold value. If data validator 126 determines that a confidence value associated with each of the "key" data values satisfies the threshold value, data validator 126 can discontinue OCR operations and flush remaining video frames or images from a buffer associated with camera 122.

After data validator 126 obtains the "key" data values from an OCR process that has evaluated a set of digital images (e.g., from a video or stream of images recorded by camera 122), data validator 126 can request the document from document server 130 using the obtained "key" data values. Once received from the document server 130, data validator 126 can provide the data from the received document to a workflow for additional processing. The document received from document server 130 may, in some cases, be treated as an authoritative, correct version of the document identified by the "key" data values of the document obtained from the OCR process.

In some cases, data validator 126 can use the data from the document received from the document server 130 (e.g., an authoritative version of the document) to generate feedback for "training" OCR engine 124 on mobile device 120 and/or other mobile devices. To generate feedback, data validator 126 can compare the value in a data field extracted by OCR engine 124 from one or more video frames or images in an image stream with the value of the field in the document obtained from document server 130. In some cases, if the value of a data field extracted by OCR engine 124 matches the value of the field in the document obtained from document server 130, data validator 126 need not generate feedback to "train" OCR engine 124.

If, however, the value of a data field extracted by OCR engine 124 is different from the value of the field in the document obtained from document server 130, data validator 126 can generate feedback to OCR engine 124 identifying the correct value for the data field, the incorrect value generated by OCR engine 124, and the source image (or portion of an image) from which OCR engine 124 extracted the incorrect value. In some cases, data validator 126 can transmit the feedback to a remote source (e.g., OCR feedback 142 in data store 140), where feedback from multiple mobile devices can be aggregated to train OCR engine 124 at mobile device 120 and the OCR engines at other mobile devices.

In some cases (e.g., when a document is not available at document server 130), data validator 126 may present an interface to a user requesting that the user confirm whether the data extracted by OCR engine 124 from a video of a source document is correct. If the data is incorrect, a user can identify the one or more incorrect values and manually enter the correct values into an application executing on mobile device 120. Data validator 126 can generate feedback for OCR engine 124 based on the identified incorrect values and the user-provided data and, in some cases, commit the feedback to data store 140 to be aggregated with feedback from other mobile devices.

Document server 130 generally provides a searchable repository of documents that may be considered authoritative, correct versions of a document used in a workflow executing on mobile device 120. As illustrated, document server 130 generally includes a document finder 132 and a document store 134. Document server 130 may identify a set of "key" data values that document finder 132 can use to obtain an authoritative version of a document from document store 134 for use in a workflow executing on mobile device 120.

Document finder 132 generally exposes a search interface to mobile device 120 for finding documents in document store 134. Using "key" data values extracted by OCR engine 124 at a mobile device 120, document finder 132 generates a query to attempt to find a document in document store 134.

If document store 134 does not return a document, document finder 132 can generate a response to mobile device 120 indicating that no document identified by the "key" data values exists at document server 130. Otherwise, document store 134 can return a response including the text content of the document identified by the "key" data, which mobile device 120 can use to validate the document text extracted by OCR engine 124 and train OCR engine 124. In an example, a response for a structured or semi-structured document may include a plurality of two-tuples associating a field name and the textual content of the field stored in document store 134.

Document store 134 generally provides a repository in which authoritative versions of documents are stored for future retrieval. Document store 134 may be structured, for example, as a relational database with one or more key values being used to uniquely identify a document.

Data store 140 generally provides a centralized repository for data used in training an OCR engine, as discussed above. As illustrated, data store 140 includes OCR feedback 142. OCR feedback 142 may be stored, for example, in a table that associates a source image (or portion of an image), the incorrect text extracted by an OCR engine (e.g., OCR engine 124 at mobile device 120), and the correct data (from an authoritative version of a document retrieved from document server 130 or user input). Developers can aggregate the data in OCR feedback 142 to, for example, identify commonly experienced OCR errors and generate one or more OCR rules to associate a given pattern of pixels representing a character with the correct character.

Figure 2:
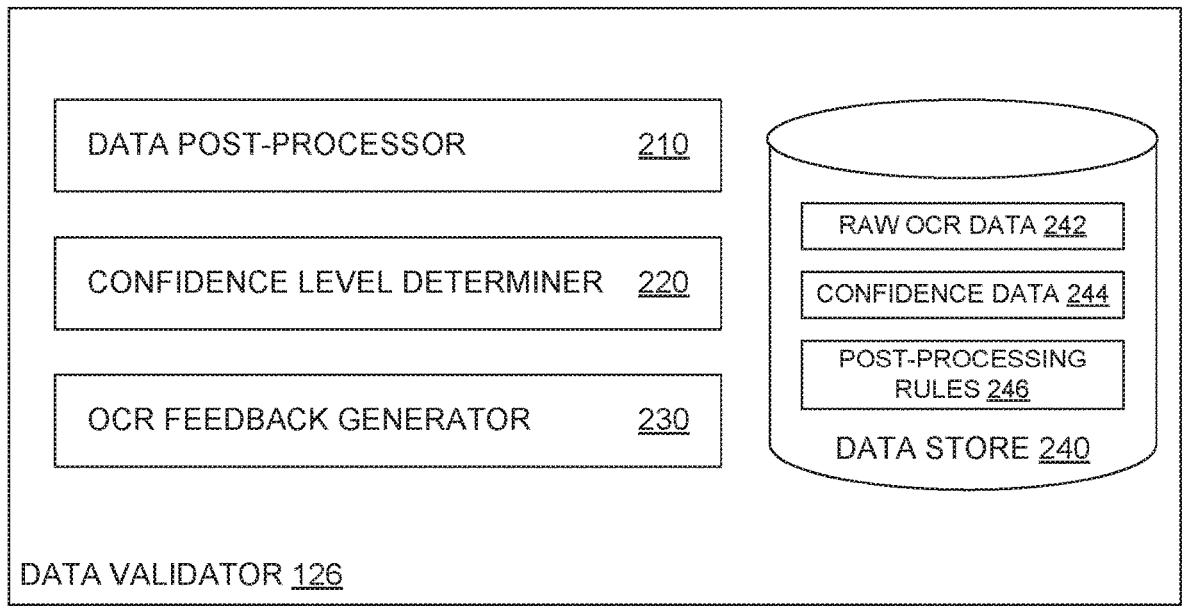
FIG. 2 illustrates an example data validator, according to one embodiment.

FIG. 2 illustrates an example data validator 126, according to one embodiment. Data validator 126 generally receives raw OCR data from OCR operations performed on a first video frame, post-processes the raw data to replace invalid characters in the raw OCR data and determine whether the OCR data is accurate, and determines whether to request OCR engine 124 to execute OCR operations on a subsequent video frame. As illustrated, data validator 126 generally includes a data post-processor 210, confidence level determiner 220, OCR feedback generator 230, and data store 240.

Data post-processor 210 is generally configured to receive raw OCR data from OCR engine 124 and apply one or more post-processing rules (e.g., post-processing rules 246 stored in data store 240) to correct errors in the raw OCR data. As discussed above, data post-processor 210 can use post-processing rules to replace invalid characters in raw OCR data with valid characters. The post-processing rules may be formatted as a regular expression indicating a pattern of characters that certain data fields are required to comply with. For example, with a social security number field in a W-2, data post-processor 210 can replace characters in the raw OCR data with characters that would satisfy the regular expression of "\d{3}-\d\d-\d{4}" (i.e., three digits, followed by a dash, followed by two digits, followed by a dash, followed by four digits).

In some cases, data post-processor 210 may be configured to adjust a confidence value associated with the raw OCR data based on the changes data post-processor 210 performed on the raw OCR data. For example, in an example where data post-processor 210 changes the raw OCR data to comply with a predefined data format for a given field, data post-processor 210 can increase the confidence level associated with the raw OCR data. In another example, if data post-processor 210 determines that the raw OCR data for a data field in a structured or semi-structured document does not comply with a predefined data format for that field, data post-processor 210 can decrease the confidence level associated with the raw OCR data (e.g., to a value less than the threshold for determining that OCR engine 124 need not extract data for the field from additional video frames or images).

Confidence level determiner 220 is generally configured to compare a confidence level associated with at least the post-processed OCR data with a threshold value to determine whether to extract raw OCR data for a field from additional video frames. If the confidence level associated with the post-processed OCR data for a field satisfies the threshold value, confidence level determiner 220 can notify OCR engine 124 to skip extracting data for that field. Otherwise, confidence level determiner 220 can request that OCR engine 124 obtain another video frame (e.g., from a video stored in a buffer associated with camera 122) and repeat the OCR process for that field.

In some cases, confidence level determiner 220 may maintain a running tally of instances of the post-processed OCR data and an average confidence level associated with each instance of the post-processed OCR data. Confidence level determiner 220 may maintain the running tally and average confidence level data until, for example, OCR engine 124 generates extracted data with a confidence level satisfying a threshold value or after extracting field data from a threshold number of video frames. In some cases, if the confidence level for each instance of the post-processed OCR data is less than the threshold value, confidence level determiner 220 can use the combination of the running tally and average confidence level for each instance of the post-processed data to determine which instance of the post-processed data to provide to the workflow executing on mobile device 120.

OCR feedback generator 230 is generally configured to obtain user input or data from an authoritative data source and compare the actual data in a source document to the data extracted using optical character recognition on one or more video frames including the source document. As discussed, OCR feedback generator 230 can obtain document data from document server 130 using one or more "key" values extracted from a source document in the video frames. If document server 130 returns document data in response to a query using the "key" values as parameters, OCR feedback generator 230 can compare the extracted value of each field in the source document to the actual data obtained from document server 130. If the extracted value of a field from a video frame including the source document matches the actual data obtained from document server 130, OCR feedback generator need not generate any feedback to train OCR engine 124 and/or OCR engines at other mobile devices used in executing the same workflow.

If, however, the extracted data of a field from a video frame including the source document does not match the actual data returned from document server 130, OCR feedback generator 230 can commit the correct and incorrect document field to a central server or OCR engine 124 for use in performing successive OCR procedures at mobile device 120 (or other mobile devices). The report may include, for example, a video frame (or portion of a video frame) that was the source of the extracted data, the extracted data (e.g., raw OCR data), and the data in a document.

In some cases, OCR feedback generator 230 may be configured to generate feedback based on user input. For example, OCR feedback generator 230 can determine that a document is not available at document server 130 and may subsequently request that a user input the actual values of fields in the source document into an application executing on mobile device 120. If the extracted data and user-provided value match, OCR feedback generator 230 need not generate any feedback to train OCR engine 124. Otherwise, OCR feedback generator 230 may generate feedback and commit the feedback to a storage repository as discussed above.

Data store 240 may be a temporary data store for storing session data during OCR operations performed on video frames including a source document, according to one embodiment. As illustrated, data store 240 generally includes raw OCR data 242, confidence data 244, and post-processing rules 246. The raw OCR data 242 and confidence data 244 may be obtained at data validator 126 from OCR engine 124 and indicate a value extracted from a video frame including the source document and a confidence level indicating a likelihood that the extracted data is correct. As discussed above, the raw OCR data 242 and confidence data 244 may, in some cases, be maintained as a running total of the number of times OCR engine 124 extracts a particular value from video frames including the source document and an average confidence level across the number of times OCR engine 124 extracts that value from the video frames.

Post-processing rules 246 generally provides one or more rules used to verify that the data extracted from one or more video frames complies with a known data format for a particular field in the source document. As discussed, the post-processing rules 246 may include, for example, a regular expression defining an expected format of data in a particular field, one or more replacement characters, and a confidence level modifier. Data validator 126 can use post-processing rules 246 to obtain accurate data from a source document included in one or more video frames and determine whether OCR engine 124 should extract data for the field from another video frame (e.g., due to low accuracy or low confidence in the accuracy of the extracted data).

Figure 3:
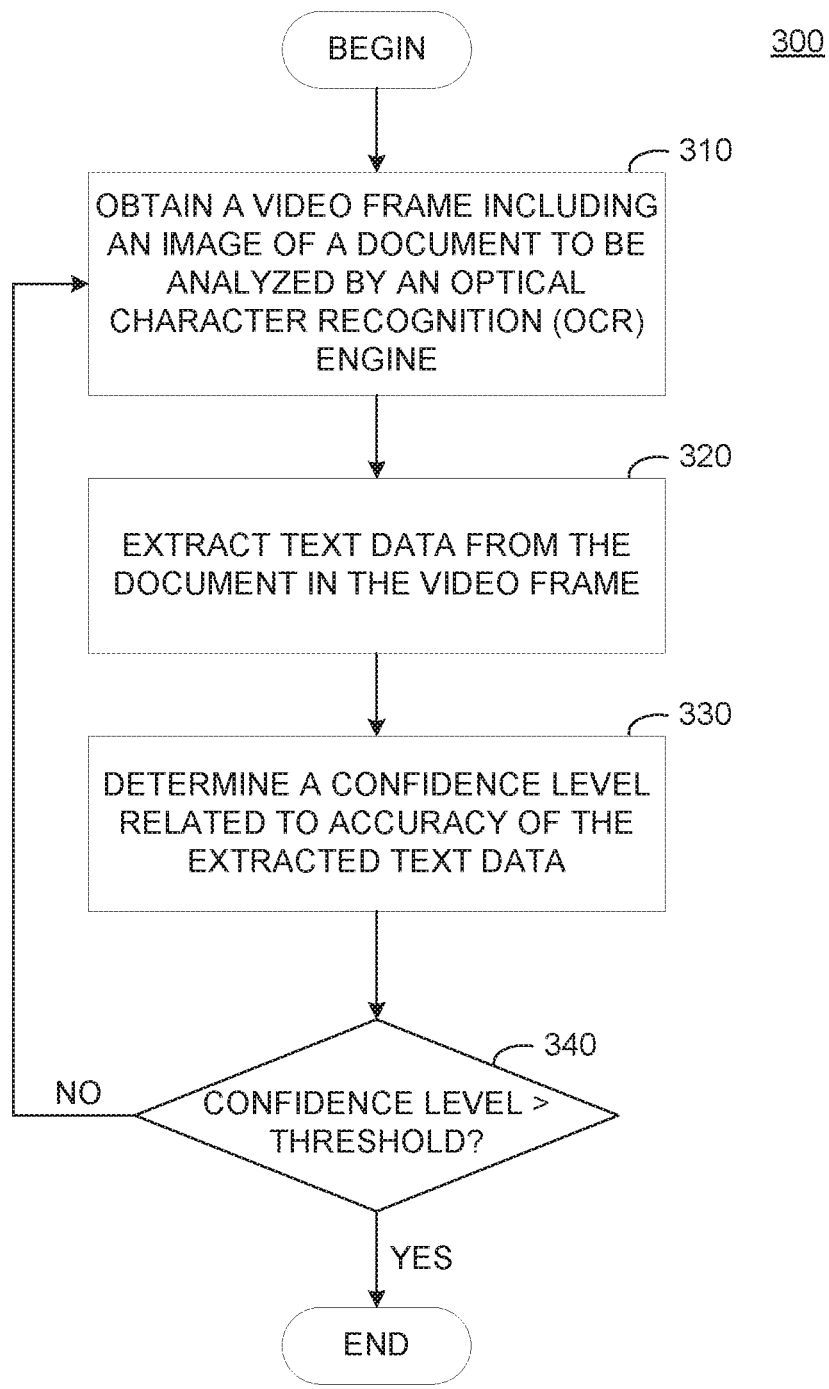
FIG. 3 illustrates an example method for performing optical character recognition on a document using one or more video frames, according to one embodiment.

FIG. 3 illustrates example operations 300 that may be performed by an OCR system in mobile device 120 (e.g., OCR engine 124 and data validator 126) to perform optical character recognition on a document included in a video frame, according to one embodiment. As illustrated, operations 300 begin at step 310, where the OCR system obtains a video frame including an image of a document to be analyzed by an optical character recognition (OCR) engine. The OCR system may obtain the video frame, for example, from a buffer used to store captured video or a stream of captured images from camera 122.

At step 320, the OCR system extracts text data from the document in the video frame. For unstructured documents, an OCR engine (e.g., OCR engine 124) may attempt to recognize any text on the document. If the OCR system is analyzing a structured or semi-structured document, the OCR system can extract data from the source document on a field-by-field basis.

After extracting text data from a document, at step 330, the OCR system determines a confidence level related to the accuracy of the extracted text data. As discussed, an OCR engine can extract textual data from a source document included in a document and include a confidence level indicating a likelihood that the extracted textual data matches the data included in the source document. The confidence level may be adjusted in data post-processing, where as discussed above, an OCR system applies corrections to raw data from an OCR engine and adjusts a confidence level based, for example, on whether the corrections result in generating a string that complies with an expected format of the string.

At step 340, the OCR system determines whether the confidence level related to the accuracy of the extracted text data satisfies a threshold value. If so, operations 300 end. Otherwise, operations 300 return to step 310, where the OCR system obtains, from camera 122, a subsequent video frame including an image of the source document to be analyzed by the OCR system. Operations 300 may continue on one or more subsequent video frames until the confidence level related to accuracy of the extracted text data from an identified one of the subsequent video frames satisfies the threshold value.

Figure 4:
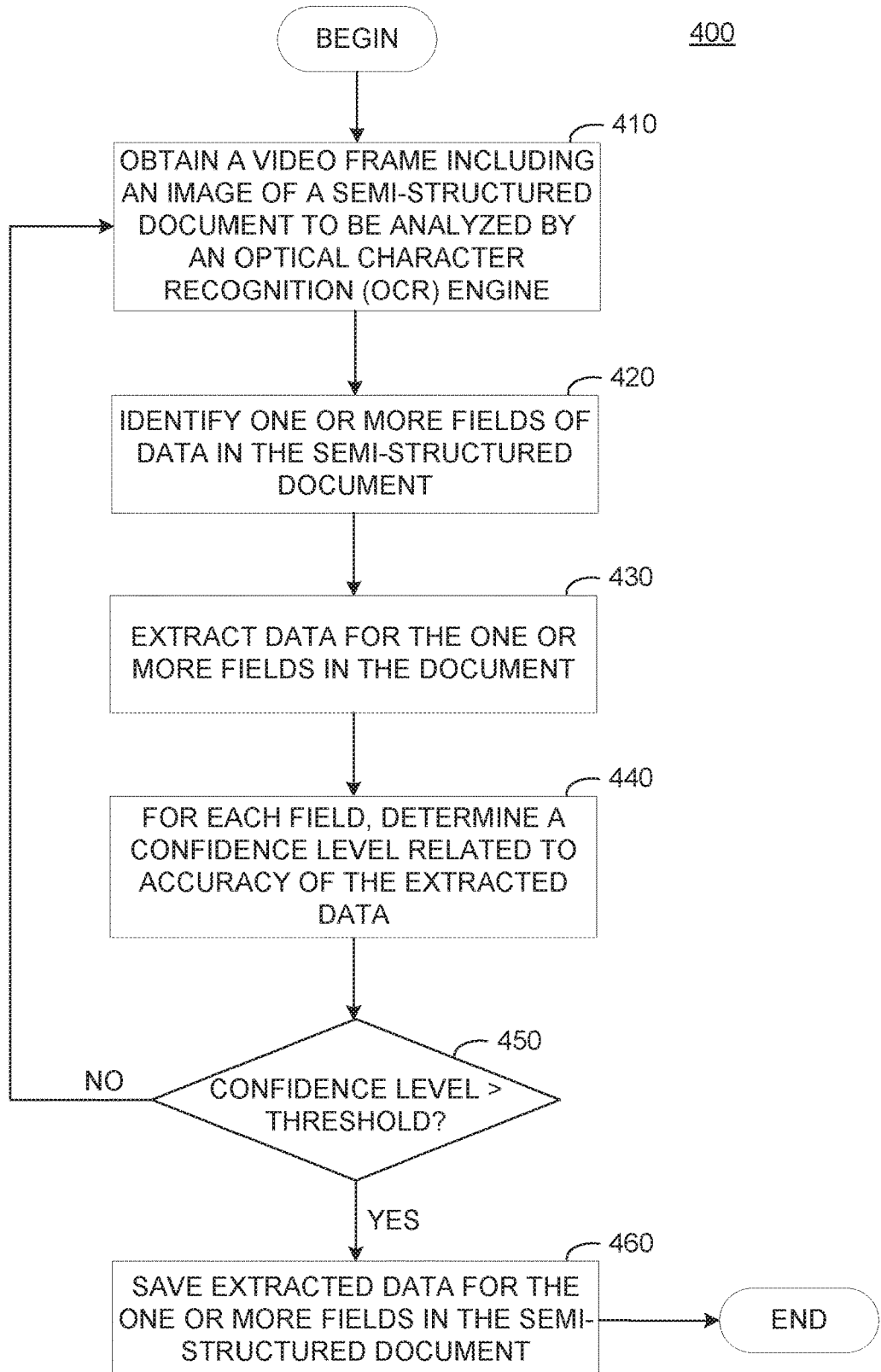
FIG. 4 illustrates an example method for performing optical character recognition on a semi-structured document using one or more video frames, according to one embodiment.

FIG. 4 illustrates example operations 400 that may be performed by an OCR system at mobile device 120 (e.g., OCR engine 124 and data validator 126) to perform optical character recognition of a semi-structured document using one or more video frames, according to one embodiment. A semi-structured document may generally include the same data fields regardless of the source of the document but may differ cosmetically (e.g., using different layouts to present the same data). As illustrated, operations 400 begin at step 410, where an OCR system obtains a video frame including an image of a semi-structured document to be analyzed by an OCR engine.

At step 420, the OCR system identifies one or more fields of data in the semi-structured document. In some cases, the OCR system can identify fields that include usable data in the video frame. Based on an identification of the fields that include and do not include usable data in the video frame, the OCR system can generate an initial list of fields to examine in OCR data generated based on successive video frames.

At step 430, the OCR system extracts data for the one or more fields in the document, and at step 440, the OCR system determines a confidence level related to the accuracy of the extracted data for each field identified in the document. As discussed herein, an OCR engine can generate an initial confidence level associated with the raw data value extracted from a video including the document. Data post-processing to correct the data recognized by an OCR engine may adjust the confidence level upwards (e.g., if the corrections result in the data complying with a format restriction for the data field) or downwards (e.g., if the post-processing is unable to replace characters in the raw OCR data with other characters that would comply with a format restriction for the data field).

At step 450, the OCR system determines whether a confidence level associated with the value of a field in a semi-structured document satisfies a threshold value. If the confidence level associated with the values of fields in a semi-structured document does satisfies a threshold value, operations 400 may proceed to step 460, where the OCR system saves the extracted data for the one or more fields in the semi-structured document. Otherwise, operations 400 restart at step 410 to allow the OCR system to obtain another video frame (e.g., from a buffer used to store video frames or a stream of images captured using camera 122) including an image of the semi-structured document for analysis.

Figure 5:
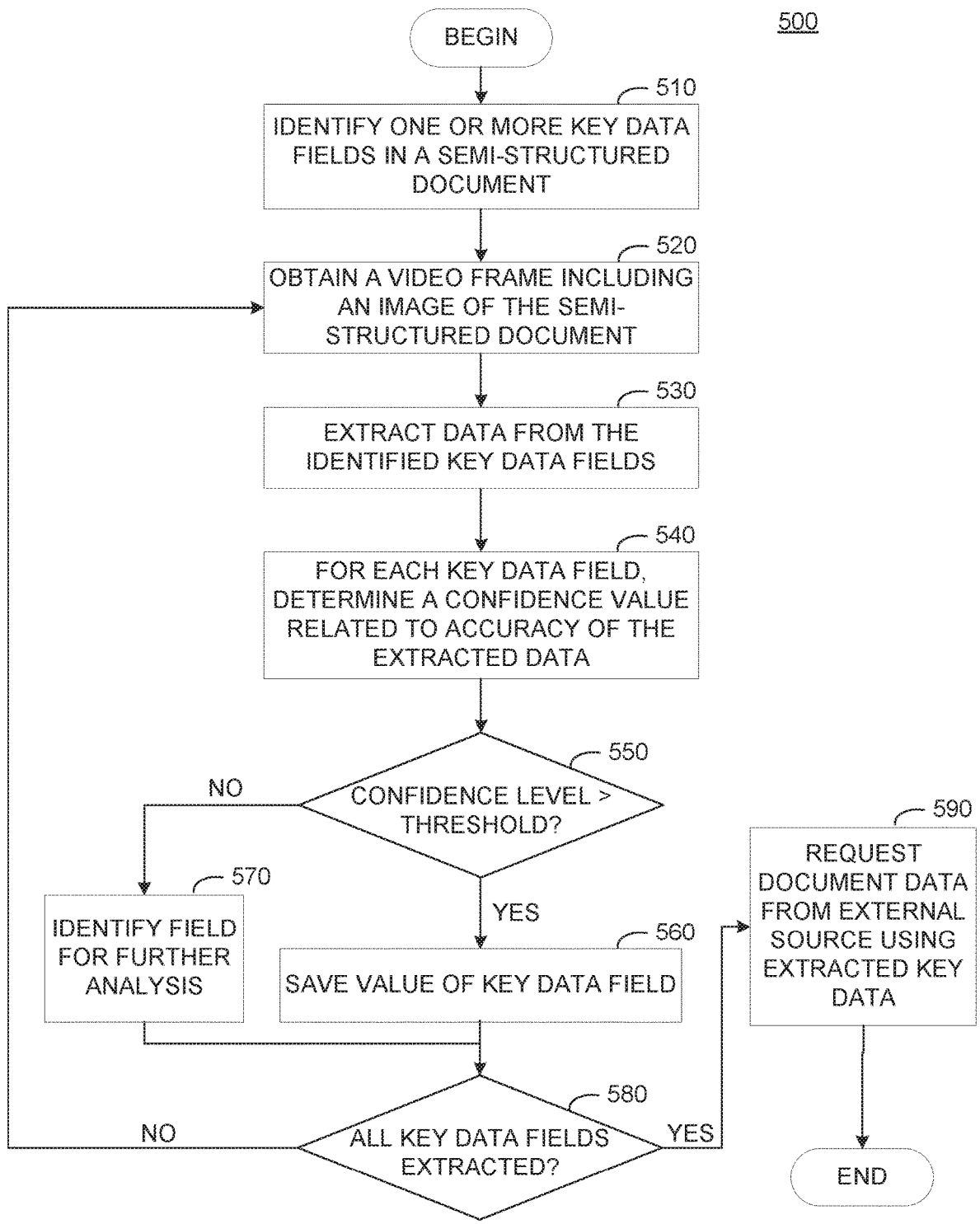
FIG. 5 illustrates an example method for obtaining document contents based on key data fields extracted using optical character recognition on a document in one or more video frames, according to one embodiment.

FIG. 5 illustrates example operations for obtaining document data from an external source using "key" data extracted from a semi-structured document, according to one embodiment. As illustrated, operations 500 begin at step 510, where an OCR system at mobile device 120 (e.g., OCR engine 124 and data validator 126) identifies one or more key data fields in a semi-structured document. The OCR system can identify key data fields in a semi-structure document, for example, based on primary keys used to identify authoritative copies of a document at document server 130. As discussed, in a tax preparation workflow where document server 130 stores (or otherwise has access to) W-2 data, the OCR system can identify the three data fields of employee social security number, employer identification number, and taxable income to identify a document. The OCR system can also identify different sets of "key" data for partnership-level tax forms, interest and dividend income, and so on. In another example, an invoice system can identify an invoice amount, payer/payee information, and an invoice number to uniquely identify an invoice stored at document server 130.

At step 520, the OCR system obtains, from a video frame buffer, a video frame including an image of the semi-structured document. At step 530, the OCR system extracts data from the identified key data fields. In some cases, if the OCR system is unable to extract data from a "key" data field in an image of the semi-structured document, the OCR system can assign a null value to the "key" data field to flag that field for additional analysis.

At step 540, the OCR system determines a confidence value related to the accuracy of the extracted data from each key data field, and at step 550, the OCR system determines whether the confidence level for the extracted data satisfies a threshold value. If so, at step 560, the OCR system can save the value of the key data field in storage or temporary memory. Otherwise (i.e., the OCR system determines that the confidence level for the "key" data field is below the threshold level), at step 570, the OCR system identifies the field for further analysis.

At step 580, the OCR system determines whether all "key" data fields have been extracted from the semi-structured document. If so, at step 590, the OCR system requests document data from an external source (e.g., document server 130) using the extracted "key" data. Otherwise, the method returns to step 520, where the OCR engine obtains another video frame including an image of the semi-structured document. The process of analyzing video frames for "key" data values may continue until the OCR system has extracted usable data for each of the "key" data fields identified for the document being analyzed.

Figure 6:
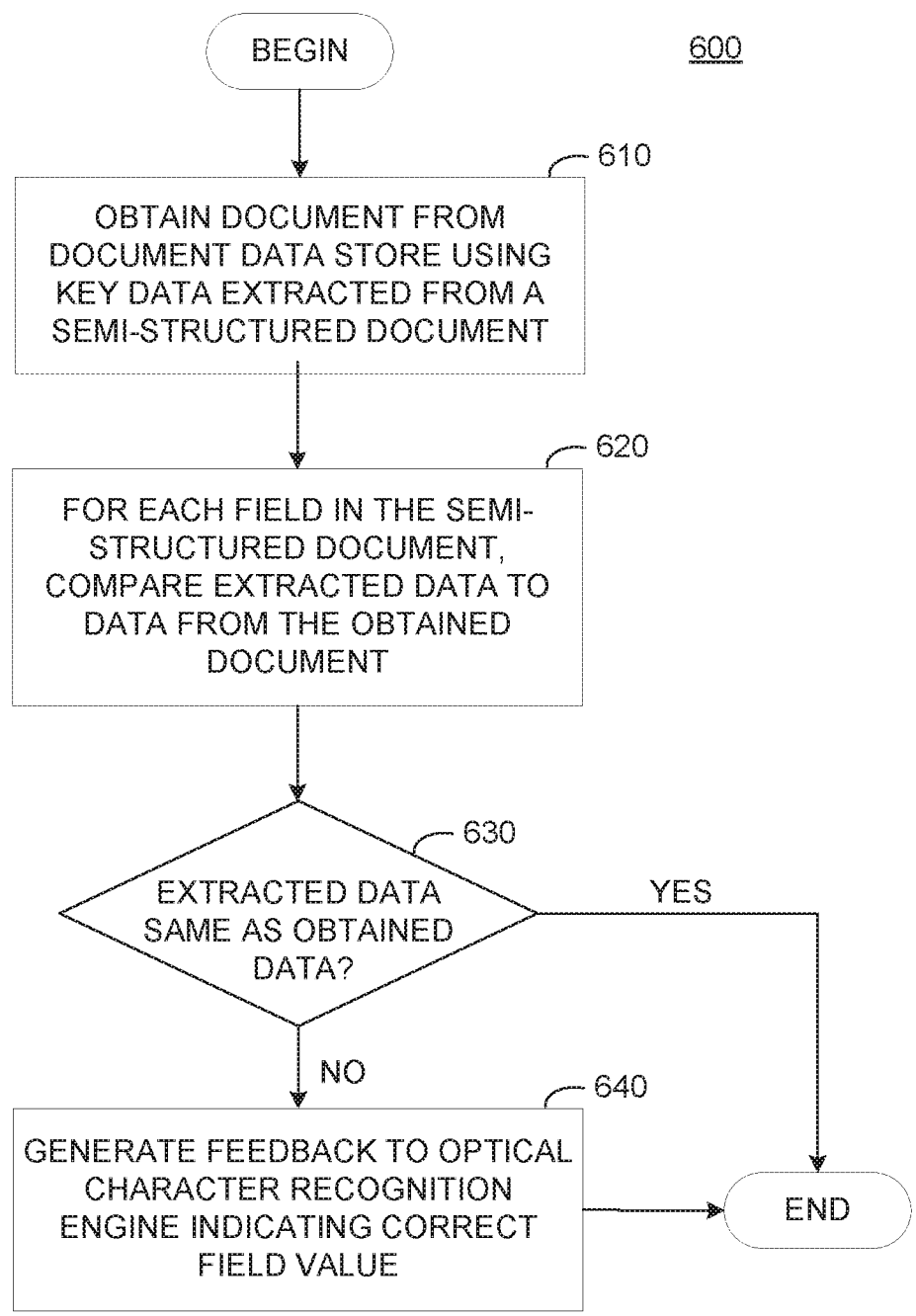
FIG. 6 illustrates an example for validating data extracted from a document against a retrieved version of the document from an external service, according to one embodiment.

FIG. 6 illustrates example operations 600 for generating OCR system feedback based on a comparison between data extracted from a video frame including an image of a source document and data from an authoritative document source, according to one embodiment. As illustrated, operations 600 begin at step 610, where a data validator 126 obtains a document from a document data store using key data extracted from a semi-structured document. The document obtained from the document data store (e.g., document server 130) may be structured in a machine-readable format as a series of two-tuples associating a field name with a value for that field.

At step 620, data validator 126 compares the extracted data from the semi-structured document to the data from the obtained document on a field-by-field basis. At step 630, data validator 126 determines whether the extracted data is the same as the obtained data. If the extracted data for a given field in a semi-structured document is the same as the field in the obtained document, data validator 126 can determine that the OCR engine successfully extracted data from the semi-structured document, and operations 600 may end with respect to that particular field.

Otherwise, at step 640, data validator 126 generates feedback to the OCR engine indicating the correct field value. As discussed, the feedback may include, for example, the video frame or portion of a video frame associated with an incorrectly decoded field, the text extracted from the video frame for the field, and the correct value of the field obtained from document server 130.

FIGS. 7A-7C illustrate an example of performing optical character recognition of a source document using successive video frames, according to one embodiment. In this example, mobile device 120 first captures video frame 710A of a W-2 form in a tax preparation workflow. As illustrated, the W-2 form includes three "key" value fields: 712A, the employee's social security number; 714A, the employer identification number, and 716A, the employee's taxable income. As illustrated in video frame 710A, fields 712A and 714A are blurred and unreadable. Because field 716A has sufficient image quality, OCR engine 124 may be able to extract the taxable income data from the video frame 710A.

Table 720A illustrates the data extracted from the W-2 form captured in video frame 710A, according to one embodiment. As illustrated, after OCR engine 124 and data validator 126 finishes analyzing video frame 710A, the mobile device has recognized one of the three "key" data fields—the employee's taxable wages—used to obtain a copy of a W-2 form from document server 130. Because OCR engine 124 was not able to extract data for the other two "key" data fields (social security number and employer identification number) from video frame 710A, OCR engine 124 can obtain another video frame from camera 122 to attempt to extract the remaining "key" data fields from the document.

FIG. 7B illustrates a second video frame 710B from which OCR engine 124 can extract data from a second of the three "key" data fields. In this case, because OCR engine 124 has already extracted a value from the source W-2 document for the employee's taxable wages, OCR engine may attempt to extract data from fields 712B and 714B in second video frame 710B. OCR engine 124 need not analyze the data in field 716B.

After OCR engine 124 analyzes second video frame 710B, OCR engine 124 may determine that the employer identification number data in field 714B is decodable. As illustrated in table 720B, the data extracted from the W-2 form after performing optical character recognition on video frames 710A and 710B include the employee's taxable wages for the year (obtained from video frame 710A) and the employer identification number (obtained from video frame 710B). Once OCR engine 124 decodes the employee's social security number in a subsequent video frame, mobile device 120 can query document server 130 for the employee's actual W-2 data using the "key" data values extracted from the source W-2 document captured in video.

FIG. 7C illustrates a third video frame 710C from which OCR engine 124 can extract data from the remaining "key" data field to be analyzed. As with the second video frame 710B discussed above OCR engine 124 need not extract data from fields 714C and 716C because OCR operations on previous video frames have already successfully extracted data from those fields. After analyzing third video frame 710C, OCR engine 124 can extract the employee's social security number from field 712C and can conclude OCR processes on buffered video data captured by camera 122.

Table 720C illustrates the extracted values of the "key" data fields in the W-2 form captured in video frames 710A-710C. Data validator 126 can use the "key" data values illustrated in table 720C to search for and obtain the document identified by the combination of taxable wages, social security number, and employer identification number.

Figure 8:
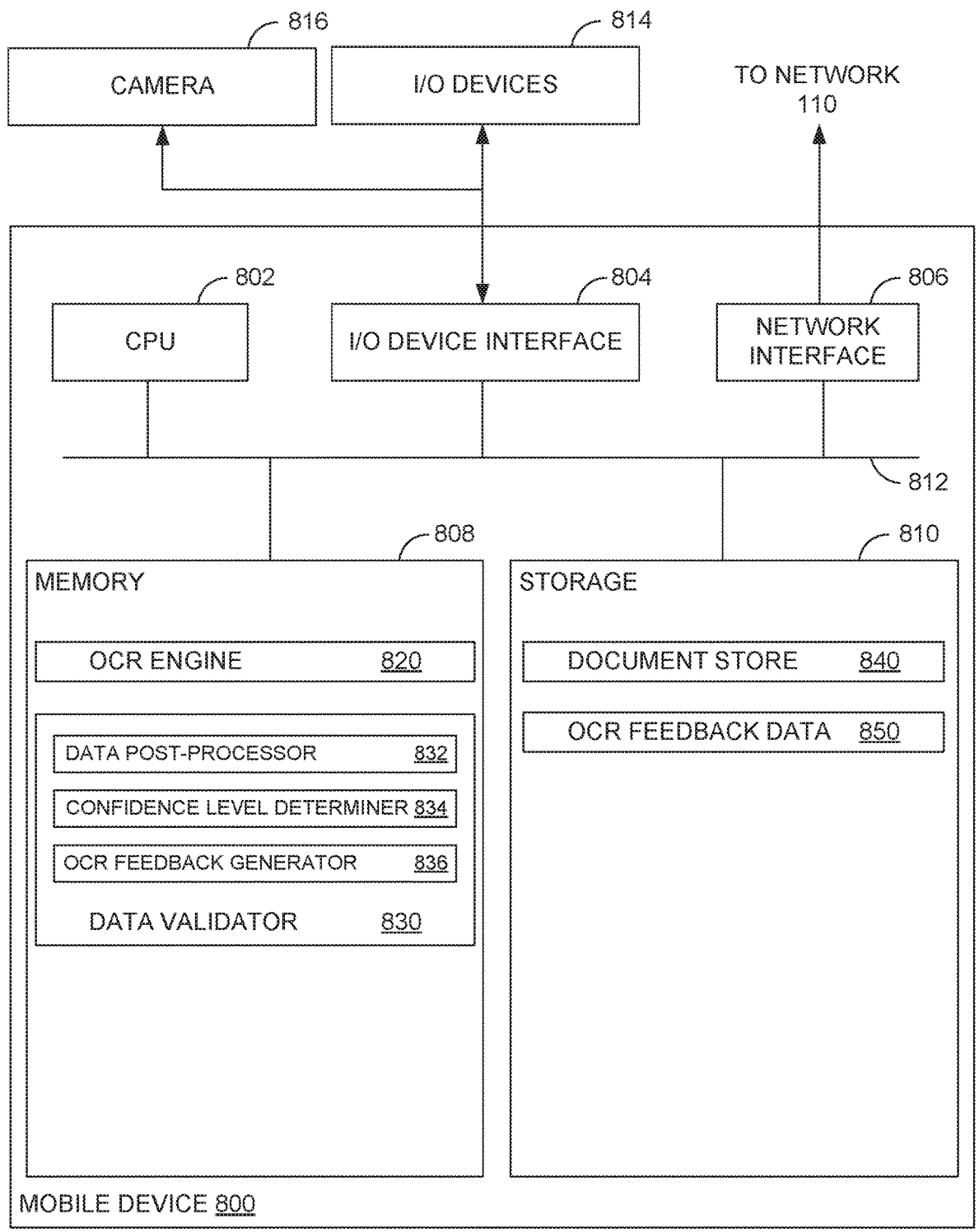
FIG. 8 illustrates an example computing system for performing optical character recognition by combining results from multiple video frames, according to one embodiment.

FIG. 8 illustrates an example system for performing optical character recognition on source documents, according to one embodiment. As shown, the mobile device 800 includes, without limitation, a central processing unit (CPU) 802, one or more I/O device interfaces 804 which may allow for the connection of various I/O devices 814 (e.g., keyboards, displays, mouse devices, pen input, etc.) and camera 816 to the mobile device 800, network interface 806, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 is included to be representative of a single CPU, multiple CPUs, a single CPU having multiple processing cores, and the like. Additionally, the memory 808 is included to be representative of a random access memory. Furthermore, the storage 810 may be a disk drive, solid state drive, or a collection of storage devices distributed across multiple storage systems. Although shown as a single unit, the storage 810 may be a combination of fixed and/or removable storage devices, such as fixed disc drives, removable memory cards or optical storage, network attached storage (NAS), or a storage area-network (SAN).

As shown, memory 808 generally includes an OCR engine 820 and data validator 830. OCR engine 820 is generally configured to obtain a video frame or image from a stream of images captured by camera 816 and extract text data from the obtained video frame. In some cases, where a document in an obtained video frame is a structured or semi-structured document, OCR engine 820 can extract data from the document on a field-by-field basis. OCR engine 820 may selective extract data from the document, in some cases, based on one or more "key" data fields that uniquely identify a specific document. To extract data from a document in an obtained video frame, OCR engine 820 can convert the video frame into a binarized image and extract the contents of the document in the video frame based on the text and field delimiters (e.g., boxes) recognized in the binarized image. When OCR engine 820 recognizes the text in the document, OCR engine 820 generally associates a confidence level with the recognized text. As discussed, the confidence level assigned by OCR engine 820 generally indicates a computed likelihood that the recognized text for a given field in a document is accurate.

Data validator 830 is generally configured to receive the extracted text and confidence data from OCR engine 820 to post-process and determine whether OCR engine 820 should perform character recognition on a document included in another video frame captured by camera 816 and stored in a video frame buffer. As illustrated, data validator 830 generally includes a data post-processor 832, confidence level determiner 834, and an OCR feedback generator 836.

Data post-processor 832 is generally configured to compare the data generated by OCR engine 820 for a particular field of a document to an expected format for one or more fields in a structured or semi-structured document. The post-processing rules data post-processor 832 uses to correct raw OCR text data may include, for example, regular expressions defining an expected format of a data field and character replacement rules to comply with the expected format of a data field. Data post-processor 832 may, in some cases, be configured to adjust a confidence value received from OCR engine 820 based, for example, on whether the post-processed text data from OCR engine 820 conforms to an associated rule for a particular field of a document. Confidence levels may be adjusted upwards for post-processed data that conforms to a rule and may be adjusted downwards for post-processed data that does not conform to the rule.

Confidence level determiner 834 is generally configured to determine whether to request that OCR engine 820 analyze another video frame or image captured by camera 816 and stored in a buffer based on confidence data associated with the data received from OCR engine 820 for previous video frames. In some cases, confidence level determiner 834 can identify portions of documents to be analyzed using another video frame such that OCR engine 820 does not perform character recognition on recognized text that is already likely to be correct.

In some cases, confidence level determiner 834 may be configured to analyze confidence levels on a running basis. For example, in a semi-structured document, confidence level determiner 834 can maintain a running tally of the number of times OCR engine 820 recognizes a particular string and an average confidence level associated with the recognized strings for each field in the semi-structured document. Over time, confidence level determiner 834 can select a string that is likely to correspond to the contents of the field by generating a score based on the number of matches and confidence level associated with a particular string.

OCR feedback generator 836 is generally configured to obtain data from a user or a document repository and compare the recognized strings to authoritative data. OCR feedback generator 836 may obtain authoritative data regarding the contents of a document by requesting user feedback or, in some cases, obtaining a copy of a document from a document store (e.g., document store 840 in storage 810 or an external document server) based on one or more "key" values recognized in a document. Based on the comparisons between authoritative data and the recognized strings, OCR feedback generator 836 may generate feedback that OCR engine 820 can use to improve the accuracy of future character recognition processes. For example, if the recognized string and data obtained from an authoritative document source are different, OCR feedback generator 836 can determine that the recognized string generated by OCR engine was incorrect. In response, OCR feedback generator 836 may generate feedback to "train" OCR engine 820. The feedback may include, for example, a source image (or portion of a source image) associated with the incorrect recognized string, the incorrect recognized string, and the data from an authoritative document source.

As shown, storage 810 includes a document store 840 and OCR feedback data 850. Document store 840 generally provides an authoritative repository for certain types of documents (e.g., W-2 forms, partnership income forms, invoices, and so on) identified by one or more "key" values unique to each document. During the OCR process, data validator 830 can query document store 840 for authoritative versions of a document identified by the one or more "key" values, and in response, document store 840 may provide a parseable or machine-readable version of a document to data validator 830. For structured or semi-structured documents, document store 840 may provide the parseable version of the document as a set of two-tuples associating a field name with the data stored in that field.

OCR feedback data 850 generally provides a repository in which OCR engine 820 logs erroneous recognized strings, the source images (or portions of an image) from which OCR engine 820 generated the erroneous string, and the actual, correct string (e.g., obtained from document store 840 or another source designated as a source for authoritative copies of a document). OCR engine 820 can use the data accumulated in OCR feedback data 850 to improve the accuracy of string recognition for subsequent OCR processes. In some cases, the feedback data stored in OCR feedback data 850 may be shared with other devices to form a consolidated corpus of data that can be used to "train" OCR engines at mobile device 800 and other devices to provide more accurate data output.

Camera 816 generally includes still image and video capture capabilities and generally outputs images and/or video frames to a buffer or other temporary storage for use in OCR operations. Camera 816 may actively record image data from when a user begins scanning a document to when data validator 830 determines that mobile device 800 has successfully scanned the document (or "key" values in the document that allow mobile device to obtain the document from an authoritative document source). While camera 816 is actively recording image data, camera 816 may continually adjust focus and exposure settings in response to commands generated by an image capture application executing on mobile device 800 to obtain a clear image of a source document. When data validator 830 determines that mobile device 800 has successfully scanned the document, data validator 830 can deactivate camera 816, which may flush any remaining video frames out of the buffer and release camera 816 for use by other applications on mobile device 800.

Advantageously, by using video data to perform optical character recognition on a document, a system can continually recognize text in a document included in video data to improve the accuracy of character recognition. Data extracted from documents in video frames and aggregated across multiple images can be used to determine strings that have a high likelihood of accurately representing the contents of a source document being scanned and processed by an OCR system.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for evaluating text depicted in images of a source document, comprising:
    receiving a stream of digital images depicting a semi-structured source document having a plurality of fields;
    for a first image of the stream of digital images:
        identifying, in the semi-structured source document, one or more key data fields,
        extracting text data from the identified one or more key data fields of the semi-structured source document as depicted in the first image, and
        determining a first confidence level regarding an accuracy of the extracted text data;
    upon determining that the first confidence level satisfies a threshold value, saving the extracted text data as recognized content of the one or more key data fields in the first image depicting the semi-structured source document;
    upon determining that the first confidence level does not satisfy the threshold value:
        extracting the text data from the one or more key data fields of the semi-structured source document as depicted in one or more additional images in the stream of digital images;
        determining a second confidence level for the text data extracted from each additional image until the second confidence level associated with the text data extracted from the additional images satisfies the threshold value, and
        saving the text data extracted from the additional images as recognized content of the one or more key data fields in the one or more additional images depicting the semi-structured source document; and
    for each of the one or more key data fields in the semi-structured source document, identifying the extracted text data from the first image or the one or more additional images as a most likely value of the key data field based, at least in part, on a frequency in which the identified extracted text data was extracted from the key data field in the first image and one or more additional images and an average confidence level associated with the identified extracted text data.

2. The method of claim 1, further comprising: obtaining an authoritative copy of the semi-structured source document from a document repository based on the extracted text data from at least the one or more key data fields.

3. The method of claim 2, wherein extracting text data from the semi-structured source document as depicted in the first image and the one or more additional images further comprises extracting text data from one or more other data fields of the semi-structured source document from the first image and the one or more additional images.

4. The method of claim 3, further comprising:
    comparing a value of a first data field of the other data fields in the authoritative copy of the semi-structured source document to extracted text data for the first field of the other data fields from the semi-structured source document; and
    upon determining that the extracted text data for the first field of the other data fields does not match the value of the first field of the other data fields in the authoritative copy, generating feedback to an optical character recognition (OCR) engine identifying at least a source image, the extracted text data designated as incorrect data, and the value of the first field in the authoritative copy designated as correct data.

5. The method of claim 1, wherein extracting text data from the semi-structured source document comprises associating an extracted name of a field with data entered in the field.

6. The method of claim 1, wherein determining the first confidence level regarding an accuracy of the extracted text data comprises:
    correcting the extracted text data for the one or more key data fields according to a rule defining a format of a permitted text for the one or more key data fields; and
    adjusting the confidence level associated with the extracted text data based on corrections performed on the extracted text data to cause the extracted text data to conform to the rule.

7. The method of claim 1, wherein determining the first confidence level regarding an accuracy of the extracted text data comprises:
    determining that a format of the extracted text data does not match a rule defining a format of a permitted text for the one or more key data fields; and
    adjusting the confidence level associated with the extracted text data to a lower confidence level in response to the determination.

8. A system, comprising:
    a processor; and
    a memory having instructions stored thereon which, when executed by the processor, performs an operation for evaluating text depicted in images of a source document, the operation comprising:
        receiving a stream of digital images depicting a semi-structured source document having a plurality of fields;
        for a first image of the stream of digital images:
            identifying, in the semi-structured source document, one or more key data fields,
            extracting text data from the identified one or more key data fields of the semi-structured source document as depicted in the first image, and determining a first confidence level regarding an accuracy of the extracted text data;

upon determining that the first confidence level satisfies a threshold value, saving the extracted text data as recognized content of the one or more key data fields in the first image depicting the semi-structured source document;

upon determining that the first confidence level does not satisfy the threshold value:

extracting the text data from the one or more key data fields of the semi-structured source document as depicted in one or more additional images in the stream of digital images;

determining a second confidence level for the text data extracted from each additional image until the second confidence level associated with the text data extracted from the additional images satisfies the threshold value, and saving the text data extracted from the additional images as recognized content of the one or more key data fields in the one or more additional images depicting the semi-structured source document; and for each of the one or more key data fields in the semi-structured source document, identifying the extracted text data from the first image or the one or more additional images as a most likely value of the key data field based, at least in part, on a frequency in which the identified extracted text data was extracted from the key data field in the first image and one or more additional images and an average confidence level associated with the identified extracted text data.

9. The system of claim 8, wherein the operation further comprises: obtaining an authoritative copy of the semi-structured source document from a document repository based on the extracted text data from at least the one or more key data fields.

10. The system of claim 9, wherein extracting text data from the semi-structured source document as depicted in the first image and the one or more additional images further comprises extracting text data from one or more other data fields of the semi-structured source document from the first image and the one or more additional images.

11. The system of claim 10, wherein the operation further comprises:

comparing a value of a first data field of the other data fields in the authoritative copy of the semi-structured source document to extracted text data for the first field of the other data fields from the semi-structured source document; and upon determining that the extracted text data for the first field of the other data fields does not match the value of the first field of the other data fields in the authoritative copy, generating feedback to an optical character recognition (OCR) engine identifying at least a source image, the extracted text data designated as incorrect data, and the value of the first field in the authoritative copy designated as correct data.

12. The system of claim 8, wherein extracting text data from the semi-structured source document comprises associating an extracted name of a field with data entered in the field.

13. The system of claim 8, wherein determining the first confidence level regarding an accuracy of the extracted text data comprises:

correcting the extracted text data for the one or more key data fields according to a rule defining a format of a permitted text for the one or more key data fields; and adjusting the confidence level associated with the extracted text data based on corrections performed on the extracted text data to cause the extracted text data to conform to the rule.

14. The system of claim 8, wherein determining the first confidence level regarding an accuracy of the extracted text data comprises:

determining that a format of the extracted text data does not match a rule defining a format of a permitted text for the one or more key data fields; and adjusting the confidence level associated with the extracted text data to a lower confidence level in response to the determination.

15. A non-transitory computer-readable medium having instructions stored thereon which, when executed by a processor, performs an operation for evaluating text depicted in images of a source document, the operation comprising:

receiving a stream of digital images depicting a semi-structured source document having a plurality of fields;

for a first image of the stream of digital images:

identifying, in the semi-structured source document, one or more key data fields, extracting text data from the identified one or more key data fields of the semi-structured source document as depicted in the first image, and determining a first confidence level regarding an accuracy of the extracted text data;

upon determining that the first confidence level satisfies a threshold value, saving the extracted text data as recognized content of the one or more key data fields in the first image depicting the semi-structured source document;

upon determining that the first confidence level does not satisfy the threshold value:

extracting the text data from the one or more key data fields of the semi-structured source document as depicted in one or more additional images in the stream of digital images;

determining a second confidence level for the text data extracted from each additional image until the second confidence level associated with the text data extracted from the additional images satisfies the threshold value, and saving the text data extracted from the additional images as recognized content of the one or more key data fields in the one or more additional images depicting the semi-structured source document; and for each of the one or more key data fields in the semi-structured source document, identifying the extracted text data from the first image or the one or more additional images as a most likely value of the key data field based, at least in part, on a frequency in which the identified extracted text data was extracted from the key data field in the first image and one or more additional images and an average confidence level associated with the identified extracted text data.

16. The non-transitory computer-readable medium of claim 15, wherein the operation further comprises: obtaining an authoritative copy of the semi-structured source document from a document repository based on the extracted text data from at least the one or more key data fields.

17. The non-transitory computer-readable medium of claim 16, wherein extracting text data from the semi-structured source document as depicted in the first image and the one or more additional images further comprises extracting text data from one or more other data fields of the semi-structured source document from the first image and the one or more additional images.

18. The non-transitory computer-readable medium of claim 17, wherein the operation further comprises:
comparing a value of a first data field of the other data fields in the authoritative copy of the semi-structured source document to extracted text data for the first field of the other data fields from the semi-structured source document; and
upon determining that the extracted text data for the first field of the other data fields does not match the value of the first field of the other data fields in the authoritative copy, generating feedback to an optical character recognition (OCR) engine identifying at least a source image, the extracted text data designated as incorrect data, and the value of the first field in the authoritative copy designated as correct data.

19. The non-transitory computer-readable medium of claim 15, wherein determining the first confidence level regarding an accuracy of the extracted text data comprises:
correcting the extracted text data for the one or more key data fields according to a rule defining a format of a permitted text for the one or more key data fields; and
adjusting the confidence level associated with the extracted text data based on corrections performed on the extracted text data to cause the extracted text data to conform to the rule.

20. The non-transitory computer-readable medium of claim 15, wherein determining the first confidence level regarding an accuracy of the extracted text data comprises:
determining that a format of the extracted text data does not match a rule defining a format of a permitted text for the one or more key data fields; and
adjusting the confidence level associated with the extracted text data to a lower confidence level in response to the determination.

\* \* \* \* \*